(12) United States Patent
Ramalingam et al.

(10) Patent No.: US 9,169,387 B2
(45) Date of Patent: Oct. 27, 2015

(54) BLENDS OF POLYPHENYLENE SULFONES AND POLYPHENYLENE SULFIDE RESINS

(71) Applicant: SABIC INNOVATIVE PLASTICS IP B.V., Bergen op Zoom (NE)

(72) Inventors: Hariharan Ramalingam, Bangalore (IN); Mark Sanner, Evansville, IN (US); Kapil Sheth, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 238 days.

(21) Appl. No.: 13/791,586

(22) Filed: Mar. 8, 2013

(65) Prior Publication Data

US 2014/0194556 A1 Jul. 10, 2014

Related U.S. Application Data

(60) Provisional application No. 61/749,177, filed on Jan. 4, 2013.

(51) Int. Cl.
| | |
|---|---|
| C08L 81/06 | (2006.01) |
| C08L 81/04 | (2006.01) |
| C08J 3/00 | (2006.01) |
| C08J 5/00 | (2006.01) |
| C08L 63/04 | (2006.01) |
| C08L 63/00 | (2006.01) |
| C08L 101/00 | (2006.01) |
| C09D 163/04 | (2006.01) |
| C09D 181/04 | (2006.01) |
| C08K 3/00 | (2006.01) |
| C09D 181/06 | (2006.01) |
| C08G 73/10 | (2006.01) |
| C08L 79/08 | (2006.01) |
| H01B 3/30 | (2006.01) |

(52) U.S. Cl.
CPC ............... *C08L 63/04* (2013.01); *C08J 3/005* (2013.01); *C08J 5/00* (2013.01); *C08L 63/00* (2013.01); *C08L 81/04* (2013.01); *C08L 81/06* (2013.01); *C08L 101/00* (2013.01); *C08G 73/1046* (2013.01); *C08J 2381/04* (2013.01); *C08J 2381/06* (2013.01); *C08J 2463/00* (2013.01); *C08J 2479/08* (2013.01); *C08J 2481/04* (2013.01); *C08J 2481/06* (2013.01); *C08K 3/00* (2013.01); *C08L 79/08* (2013.01); *C09D 163/04* (2013.01); *C09D 181/04* (2013.01); *C09D 181/06* (2013.01); *H01B 3/306* (2013.01); *H01B 3/307* (2013.01)

(58) Field of Classification Search
USPC .................................................. 525/535, 537
See application file for complete search history.

(56) References Cited

U.S. PATENT DOCUMENTS

| | | | | |
|---|---|---|---|---|
| 4,021,596 A | * | 5/1977 | Bailey ........................... | 428/375 |
| 4,985,293 A | | 1/1991 | Keep | |
| 5,502,102 A | * | 3/1996 | Nazareth ....................... | 524/494 |
| 5,840,793 A | * | 11/1998 | Glaser et al. .................. | 524/423 |
| 6,612,343 B2 | | 9/2003 | Camberlin et al. | |

FOREIGN PATENT DOCUMENTS

| | | |
|---|---|---|
| CA | 2154070 | 8/2004 |
| EP | 0104543 | 4/1984 |
| EP | 1997852 A1 | 3/2008 |
| GB | 2486998 | 7/2012 |
| JP | 4-339860 | 11/1992 |
| JP | 2007-2221 | 1/2007 |
| JP | 2007112907 | 5/2007 |
| JP | 4283264 | 3/2009 |
| WO | WO2012/053505 A1 | 4/2012 |
| WO | WO2013/049099 A1 | 4/2013 |
| WO | WO2013/049100 A1 | 4/2013 |

OTHER PUBLICATIONS

Oswald et al. "International Plastics Handbook", pp. 613-617 (2006).*
International Preliminary Report on Patentability; PCT/US2013/075644; Date of Issuance of this report Jul. 7, 2015.
Notification Concerning Transmittal of International Preliminary Report on Patentability; PCT/US2013/075644; Date of mailing Jul. 16, 2015.
International Preliminary Report on Patentability; PCT/US2013/075650; Date of Issuance of this report Jul. 7, 2015.
Notification Concerning Transmittal of International Preliminary Report on Patentability; PCT/US2013/075650; Date of mailing Jul. 16, 2015.

* cited by examiner

*Primary Examiner* — Michael J Feely
(74) *Attorney, Agent, or Firm* — Novak Druce Connolly Bove + Quigg LLP

(57) ABSTRACT

Blends of a polyphenylene sulfone (PPSU); a polyphenylene sulfide (PPS); and, a polyetherimide and epoxy. The polyetherimide and epoxy are present in an amount effective to act as a compatibilizer for the polyphenylene sulfone (PPSU) and polyphenylene sulfide (PPS). Methods of compatibilizing a blend of polyphenylene sulfone (PPSU) and polyphenylene sulfide (PPS). The method can include melt mixing a polyphenylene sulfone (PPSU) and a polyetherimide; and melt mixing a polyphenylene sulfide (PPS) and an epoxy.

21 Claims, No Drawings

BLENDS OF POLYPHENYLENE SULFONES AND POLYPHENYLENE SULFIDE RESINS

CROSS REFERENCE TO RELATED APPLICATIONS

This application is a Non-Provisional of U.S. Application Ser. No. 61/749,177, having been filed on Jan. 4, 2013, herein incorporated by reference in its entirety.

BACKGROUND OF THE INVENTION

There has long been interest in developing thermoplastic blends containing semi-crystalline and amorphous materials that exhibit chemical resistance and good mechanical property retention at high temperature. Many semi-crystalline polymer blends demonstrate excellent chemical resistance and are well known in the art. However, the addition of neat amorphous materials to obtain high temperature property retention is not as well known or documented in the literature. These polymer blends generally tend to be incompatible and difficult to compound without the addition of fillers or additives such as glass, talc or mica. When a compatible unfilled resin blend is desired, it is often necessary to add a small amount of another ingredient or compatibilizer to promote more thorough blending between the two polymers. The additional ingredient(s) may work by promoting bond formation between the diverse polymer molecules of each material. It is very difficult to determine what ingredient(s) may work since compatibilizers that are effective in one polymer blend system may not be effective in others; a great deal depends upon the chemistry and specific functionalities of the molecules being blended and their interaction.

The reason for blending polymers is to create compositions that are better at meeting a specific need than an individual polymer or a polymer blend known in the art. Accordingly, it is sometimes desired to combine a polymer with another in the hopes of creating a blend exhibiting the desired characteristics of both polymers. In the present invention, polyphenylene sulfide (PPS) demonstrates excellent chemical resistance and good thermal stability which may potentially be important for polymer blends desiring such characteristics. In addition, polyphenylene sulfones (PPSU) exhibit excellent mechanical property retention at high temperature. The combination of these material properties is highly desirable, however PPSU and PPS are incompatible and therefore material blends are very difficult to compound and make into commercial products. The PPSU/PPS blends tend to have a morphology with large regions or domains of the individual polymers rather than fine, well-dispersed domains. The large domains tend to produce a material with poor mechanical properties, e.g. injection molded parts having poor tensile properties.

BRIEF SUMMARY OF THE INVENTION

Various embodiments relate to the preparation of forming compatible immiscible phase-separated blends of polyphenylene sulfones (PPSU) and polyphenylene sulfides (PPS). The new resin blend adds polyetherimide (PEI) with an epoxy to compatibilize the blend and significantly improve material properties. The new resin blend demonstrates excellent mechanical and thermal properties as well as having good melt flow characteristics. The phase-separated blends improves the high temperature load bearing capability and dimensional stability of PPS and melt flow, chemical resistance and flame resistance properties of PPSU.

Various embodiments describe a process by which a PPS resin having reactive end groups (such as thiol and chlorine) is compatibilized with PPSU resin, or derivatives thereof, using a mixture of PEI and epoxies as compatibilizers. In this invention two polymers are blended and melt mixed with compatibilizers and extruded into a pellet.

Various embodiments provide a process for forming compatible PPS blends with other thermoplastic materials that are either amorphous or semi-crystalline in nature. Other embodiments provide a process for reactive compatibilizing of PPSU and PPS materials. It is also understood, the blends material properties such as melt flow, impact and thermal resistance, chemical resistance, electrical properties and flame resistance can be tailored as desired by varying the compositions of the individual constituents, PPS, PPSU, PEI and epoxy.

These and other features, aspects, and advantages of the present invention will become better understood with reference to the following description and appended claims.

DETAILED DESCRIPTION OF THE INVENTION

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to a composition comprising a blend of: a polyphenylene sulfone (PPSU); a polyphenylene sulfide (PPS); and, a polyetherimide and epoxy, wherein the polyetherimide and epoxy are present in an amount effective to act as a compatibilizer for the polyphenylene sulfone (PPSU) and polyphenylene sulfide (PPS).

The composition can have within a range having a lower limit and/or an upper limit. The range can include or exclude the lower limit and/or the upper limit. The lower limit and/or upper limit can be selected from 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 MPa. For example, according to certain preferred embodiments, the composition can have a tensile strength greater than 75 MPa.

The composition can have within a range having a lower limit and/or an upper limit. The range can include or exclude the lower limit and/or the upper limit. The lower limit and/or upper limit can be selected from 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, and 400 J/m. For example, according to certain preferred embodiments, the composition can have an impact strength of at least 40 J/m.

The composition can have within a range having a lower limit and/or an upper limit. The range can include or exclude the lower limit and/or the upper limit. The lower limit and/or upper limit can be selected from 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100%. For example, according to certain preferred embodiments, the composition can have an elongation at break of at least 70%.

The epoxy can be an multi-functional epoxies for example, according to certain preferred embodiments, the composition can have an epoxy cresol Novolac resin.

The polyphenylene sulfide (PPS) can be a linear poly(phenylene) sulfide.

The morphology of the composition can be fine, well-dispersed domains of polyphenylene sulfone (PPSU) and polyphenylene sulfide (PPS).

The polyetherimide can be present in an amount within a range having a lower limit and/or an upper limit. The range can include or exclude the lower limit and/or the upper limit. The lower limit and/or upper limit can be selected from 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, and 30 weight percent based on the total weight of the composition. For example, according to certain preferred embodiments, the polyetherimide can be present in an amount of from 2.5-15 weight percent based on the total weight of the composition.

The epoxy can be present in an amount within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 11, 12, 13, 14, 15, 16, 17, 18, 19, and 20 weight percent based on the total weight of the composition. For example, according to certain preferred embodiments, the epoxy can be present in an amount of from 0.5-1.5 weight percent based on the total weight of the composition.

The composition can exhibit a heat distortion temperature (HDT) within a range having a lower limit and/or an upper limit. The range can include or exclude the lower limit and/or the upper limit. The lower limit and/or upper limit can be selected from 75, 76, 77, 78, 79, 80, 81, 82, 83, 84, 85, 86, 87, 88, 89, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 260, 270, 280, 290, and 300 degrees Celsius. For example, according to certain preferred embodiments, the composition can exhibit a heat distortion temperature (HDT) of at least 87 degrees Celsius The polyphenylene sulfone (PPSU) can be present in an amount within a range having a lower limit and/or an upper limit. The range can include or exclude the lower limit and/or the upper limit. The lower limit and/or upper limit can be selected from 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, and 90 weight percent based on the total weight of the composition. For example, according to certain preferred embodiments, the polyphenylene sulfone (PPSU) can be present in an amount of from 24.5-74.5 weight percent based on the total weight of the composition.

The polyphenylene sulfide (PPS) can be present in an amount within a range having a lower limit and/or an upper limit. The range can include or exclude the lower limit and/or the upper limit. The lower limit and/or upper limit can be selected from 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, and 90 weight percent based on the total weight of the composition. For example, according to certain preferred embodiments, the polyphenylene sulfide (PPS) can be present in an amount of from 25-74.5 weight percent based on the total weight of the composition.

Various embodiments relate to an extrudate comprising the composition according to other embodiments described herein. Various embodiments relate to a molded product comprising the composition according to other embodiments described herein.

Another embodiment relates to a method of compatibilizing a blend of polyphenylene sulfone (PPSU) and polyphenylene sulfide (PPS). The method can include a) melt mixing a polyphenylene sulfone (PPSU) and a polyetherimide; and b) melt mixing a polyphenylene sulfide (PPS) and an epoxy. The melt mixing a polyphenylene sulfone (PPSU) and a polyetherimide; and the melt mixing a polyphenylene sulfide (PPS) and an epoxy can be carried out by one of the group consisting of sequential mixing and simultaneous mixing.

The method can be performed by a two pass method, in which an initial mixture of step a) is formed in an initial pass in an extruder and step b) is performed in a second pass through the extruder.

According to various embodiments, steps a) and b) can be performed in a single pass in an extruder or performed in a twin screw, vented extruder. The screws of the twin screw, vented extruded can be run at a rotation within a range having a lower limit and/or an upper limit. The range can include or exclude the lower limit and/or the upper limit. The lower limit and/or upper limit can be selected from 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, and 500 rotations per minute (rpm) under vacuum. For example, according to certain preferred embodiments, the screws of the twin screw, vented extruded can be run at a rotation of about 250 rotations per minute (rpm) under vacuum.

According to various embodiments, steps a) and b) can be performed at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 305, 310, 315, 320, 325, 330, 335, 340, 345, 350, 355, 360, 370, 380, 390, 400, 410, 420, 430, 440, 450, 460, 470, 480, 490, and 500 degrees Celsius. For example, according to certain preferred embodiments, according to various embodiments, steps a) and b) can be performed at a temperature in the range of 300 to 360 degrees Celsius.

According to various embodiments step a) can be performed at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 310, 320, 330, 340, 340.5, 341, 341.5, 342, 342.5, 343, 343.5, 344, 344.5, 345, 345.5, 346, 346.5, 347, 347.5, 348, 348.5, 349, 349.5, 350, 350.5, 351, 351.5, 352, 352.5, 353, 353.5, 354, 354.5, 355, 355.5, 356, 356.5, 357, 357.5, 358, 358.5, 359, 359.5, 360, 360.5, 361, 361.5, 362, 362.5, 363, 363.5, 364, 364.5, 365, 365.5, 366, 366.5, 367, 367.5, 368, 368.5, 369, 369.5, 370, 380, 390, 400, 410, 420, 430, 440, 450, 460, 470, 480, 490, and 500 degrees Celsius. For example, according to certain preferred embodiments, according to various embodiments step a) can be performed at a temperature in the range of 350 to 360 degrees Celsius.

According to various embodiments step b) can be performed at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 310, 320, 320.5, 321, 321.5, 322, 322.5, 323, 323.5, 324, 324.5, 325, 325.5, 326, 326.5, 327, 327.5, 328, 328.5, 329, 329.5, 330, 330.5, 331, 331.5, 332, 332.5, 333, 333.5, 334, 334.5, 335, 335.5, 336, 336.5, 337, 337.5, 338, 338.5, 339, 339.5, 340, 340.5, 341, 341.5, 342, 342.5, 343, 343.5, 344, 344.5, 345, 345.5, 346, 346.5, 347, 347.5, 348, 348.5, 349, 349.5, 350, 360, 370, 380, 390, 400, 410, 420, 430, 440, 450, 460, 470, 480, 490, and 500 degrees Celsius. For example, according to certain preferred embodiments, according to various embodiments step b) can be performed at a temperature of 330 to 340 degrees Celsius.

Various embodiments relate to a method of compatibilizing a blend of polyphenylene sulfone (PPSU) and polyphenylene sulfide (PPS). The method can include step a) melt mixing a polyphenylene sulfide (PSU), a polyetherimide and an epoxy to form an initial mixture; and step b) melt mixing the initial mixture of step a) with a polyphenylene sulfone (PPSU). According to various embodiments, steps a) and b) can be performed in a vented, twin screw extruder.

According to various embodiments step a) can be performed at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 310, 320, 330, 330.5, 331, 331.5, 332, 332.5, 333, 333.5, 334, 334.5, 335, 335.5, 336, 336.5, 337, 337.5, 338, 338.5, 339, 339.5, 340, 340.5, 341, 341.5, 342, 342.5, 343, 343.5, 344, 344.5, 345, 345.5, 346, 346.5, 347, 347.5, 348, 348.5, 349, 349.5, 350, 350.5, 351, 351.5, 352, 352.5, 353, 353.5, 354, 354.5, 355, 355.5, 356, 356.5, 357, 357.5, 358, 358.5, 359, 359.5, 360, 370, 380, 390, 400, 410, 420, 430, 440, 450, 460, 470, 480, 490, and 500 degrees Celsius. For example, according to certain preferred embodiments, according to various embodiments step a) can be performed at a temperature in the range of 340 to 350 degrees Celsius.

According to various embodiments step b) can be performed at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 310, 320, 330, 330.5, 331, 331.5, 332, 332.5, 333, 333.5, 334, 334.5, 335, 335.5, 336, 336.5, 337, 337.5, 338, 338.5, 339, 339.5, 340, 340.5, 341, 341.5, 342, 342.5, 343, 343.5, 344, 344.5, 345, 345.5, 346, 346.5, 347, 347.5, 348, 348.5, 349, 349.5, 350, 350.5, 351, 351.5, 352, 352.5, 353, 353.5, 354, 354.5, 355, 355.5, 356, 356.5, 357, 357.5, 358, 358.5, 359, 359.5, 360, 370, 380, 390, 400, 410, 420, 430, 440, 450, 460, 470, 480, 490, and 500 degrees Celsius. For example, according to certain preferred embodiments, according to various embodiments step b) can be performed at a temperature in the range of 340 to 350 degrees Celsius.

EXAMPLES

Table 1 summarizes materials employed in the examples.

TABLE 1

| Material | Description | Source |
|---|---|---|
| Polyphenylene Sulfone (PPSU) | Radel R ® 5100NT | Solvay |
| Polyetherimide (PEI) | ULTEM ® 1010 | SABIC Innovative Plastics |
| Linear poly(phenylene sulfide) (PPS) | Fortron ® 0214B | Ticona |
| Polymeric compound with 24 pendant epoxy per molecule (avg) | Joncryl ® ADR4368 | BASF |
| Epoxy cresol novolac resin (ECN) | Poly(o-cresyl glycidyl ether)-co-formaldehyde | Aldrich |

Techniques & Procedures
Composition Preparation Techniques:

Resin blend compositions were formed by melt mixing of polyphenylene sulfone (PPSU) and polyphenylene sulfide (PPS). The resin blends were compounded by extrusion in a 2.5-inch twin screw, vacuum vented extruder. Material blends evaluated are presented in tabular form with each constituent reported on a weight percent basis of the total. The extruder temperature was profiled and ranged from 300 to 350° C. at the feed throat and die respectively. The blends were extruded at 250 rotations per minute (rpm) under vacuum. Resin blends were made using one of three compounding methods, 1) a single pass method as described above, 2) two pass method in which PPSU and PEI were melt mixed at 350 to 360° C. to form an initial mixture and then subsequently melt mixed with PPS and ECN resins at 330 to 340° C. or 3) modified two pass method in which PEI, PPS and ECN resins were melt mixed at 340 to 350° C. to form an initial mixture and then melt mixed with PPSU at 340 to 350° C. Independent of the compounding method used, the extrudate was water cooled, chopped and pelletized. The resin was dried at 150° C. in preparation for injection molding of test samples. Resin blends were injection molded into ASTM test samples using a barrel temperature setting of 340 to 350° C. with mold temperature settings of 80 to 150° C. and 30 second cycle time.

Properties Testing

Properties were measured using ASTM test methods. All molded samples were conditioned for at least 48 hours at 50% relative humidity prior to testing.

ASTM D256: Notched Izod impact values were measured at room temperature on 3.2 millimeter thick bars as per ASTM D256. Bars were notched prior to oven aging and tested at room temperature. Results are reported in Joules per meter (J/m).

ASTM D638: Tensile properties were measured on 3.2 millimeter type I bars as per ASTM method D638 at 23° C. with a crosshead speed of 5 millimeters/minute. Tensile strength is reported at yield (Y) while percent elongation (% Elongation) is reported at break (B). Tensile modulus, tensile strength at yield and tensile strength at break results are reported in MPa.

ASTM 0648: Heat Deflection Temperature (HDT) was measured on a 3.2 millimeter injection molded bar at 1.82 MPa Stress. HDT is reported in degree Celsius (C).

Results

According to various embodiments PPSU and PPS resin blends and the excellent compatibility of these materials as a result of adding PEI and ECN as compatibilizers. The amount of PEI in the blend was limited to less than 25 wt % while epoxy ranged from 0.5 to 1.5 wt %. The blends exhibits excellent processability with improved tensile and impact resistance properties. The new compatibilized PPSU/PPS blends demonstrate improved mechanical, thermal and melt flow properties over a range of compositions as presented in the following tables.

Examples 1-12

The purpose of examples 1-12 was to demonstrate the effect of changing the amounts and types of polymeric compatibilizers in compositions having PPSU and PPS resins. Compositions were made in accordance to the composition preparation procedure described above. The compositions were tested as described above and results are shown in Tables 2A and 2B.

TABLE 2A

| Polymer Type | 1* | 2 | 3* | 4* | 5* | 6 |
| --- | --- | --- | --- | --- | --- | --- |
| PPSU | 25 | 24.5 | 24.5 | 20 | 50 | 49.5 |
| PPS | 75 | 74.5 | 74.5 | 70 | 50 | 49.5 |
| PEI | | | | 10 | | |
| ECN | | 1 | | 1 | | 1 |
| Joncryl ADR 4368 | | | 1 | | | |
| Tensile strength (MPa) | 66 | 75 | 74 | 68 | 67 | 75 |
| Tensile modulus (GPa) | 3068 | 3292 | 2957 | 3281 | 2817 | 2776 |
| % Elongation | 5 | 77 | 42 | 4 | 84 | 88 |
| Flexural modulus (GPa) | 2522 | 2581 | 2564 | 2657 | 2326 | 2438 |
| Flexural strength (MPa) | 104 | 110 | 110 | 109 | 105 | 111 |
| MFR 337° C., 6.7 Kg, 5 min (g/10 min) | 108 | 32 | 41 | 79 | 61 | 14 |
| HDT (1.82 MPa) | 86 | 87 | 89 | 88 | 95 | 102 |
| Notched Izod Impact (J/m) | 28 | 43 | 40 | 14 | 31 | 69 |

*Comparative Example

TABLE 2B

| Polymer Type | 7* | 8* | 9* | 10 | 11* | 12* |
| --- | --- | --- | --- | --- | --- | --- |
| PPSU | 49.5 | 45 | 75 | 74.5 | 74.5 | 70 |
| PPS | 49.5 | 45 | 25 | 24.5 | 24.5 | 20 |
| PEI | | 10 | | | | 10 |
| ECN | | | | 1 | | |
| Joncryl ADR 4368 | 1 | | | | 1 | |
| Tensile strength (MPa) | 73 | 70 | 70 | 77 | 74 | 75 |
| Tensile modulus (GPa) | 2683 | 2604 | 2292 | 2408 | 2471 | 2739 |
| % Elongation | 87 | 49 | 60 | 70 | 25 | 64 |
| Flexural modulus (GPa) | 2461 | 2549 | 2385 | 2445 | 2461 | 2521 |
| Flexural strength (MPa) | 109 | 113 | 109 | 113 | 114 | 112 |
| MFR 337° C., 6.7 Kg, 5 min (g/10 min) | 15 | 63 | 17 | 13 | 9 | 15 |
| HDT (1.82 MPa) | 100 | 99 | 156 | 157 | 158 | 165 |
| Notched Izod Impact (J/m) | 60 | 32 | 113 | 132 | 147 | 102 |

*Comparative Example

These examples demonstrate that only by using a Novolac epoxy (ECN) resin in the required amount yields a composition capable of achieving a combination of a tensile strength greater than or equal to 75 MPa, impact strength of greater than or equal to 40 J/m, heat deflection temperature greater than or equal to 85° C. and an elongation at break greater than or equal to 70%. This is valid over a composition range of 25-75 wt % PPSU and 25-75 wt % PPS.

Examples 12-23

The purpose of examples 12-23 was to demonstrate the effect of changing the amounts of Novolac epoxy resin as well as the effect of alternate polymeric compounds having pendant epoxy groups in compositions having PPS and PPSU resins. Compositions were made in accordance with the composition preparation procedure described above. The compositions were tested as described above and results are shown in Tables 3A and 3B.

TABLE 3A

| Polymer | 12* | 13* | 14 | 15* | 16* | 17* |
| --- | --- | --- | --- | --- | --- | --- |
| PPSU | 25 | 24.75 | 24.5 | 24.25 | 50 | 49.75 |
| PPS | 75 | 74.75 | 74.5 | 74.25 | 50 | 49.75 |
| ECN | | 0.5 | 1 | 1.5 | | 0.5 |
| Tensile strength (MPa) | 66 | 75 | 75 | 73 | 67 | 74 |
| Tensile modulus (GPa) | 3068 | 3013 | 3292 | 2941 | 2817 | 3275 |
| % Elongation | 5 | 3 | 77 | 79 | 84 | 70 |
| Flexural strength (MPa) | 104 | 122 | 110 | 119 | 105 | 126 |
| Flexural modulus (GPa) | 2522 | 2682 | 2581 | 2848 | 2326 | 3082 |
| MFR 337° C., 6.7 Kg, 5 min (g/10 min) | 108 | 61 | 32 | 16 | 61 | 13 |
| HDT (1.82 MPa) | 86 | 87 | 87 | 84 | 102 | 105 |
| Notched Izod Impact (J/m) | 28 | 40 | 46 | 43 | 31 | 47 |

*Comparative Example

TABLE 3B

| Polymer | 18 | 19* | 20* | 21* | 22 | 23* |
| --- | --- | --- | --- | --- | --- | --- |
| PPSU | 49.5 | 49.25 | 75 | 74.75 | 74.5 | 74.25 |
| PPS | 49.5 | 49.25 | 25 | 24.75 | 24.5 | 24.25 |
| ECN | 1 | 1.5 | | 0.5 | 1 | 1.5 |
| Tensile strength (MPa) | 75 | 72 | 70 | 73 | 77 | 73 |

TABLE 3B-continued

| Polymer | 18 | 19* | 20* | 21* | 22 | 23* |
|---|---|---|---|---|---|---|
| Tensile modulus (GPa) | 2776 | 2489 | 2292 | 2837 | 2406 | 2469 |
| % Elongation | 88 | 68 | 60 | 60 | 70 | 55 |
| Flexural strength (MPa) | 111 | 116 | 109 | 119 | 113 | 116 |
| Flexural modulus (GPa) | 2438 | 2551 | 2385 | 2852 | 2445 | 2581 |
| MFR 337° C., 6.7 Kg, 5 min (g/10 min) | 14 | 14 | 17 | 23 | 13 | 13 |
| HDT (1.82 MPa) | 102 | 103 | 156 | 158 | 157 | 155 |
| Notched Izod Impact (J/m) | 69 | 59 | 113 | 62 | 132 | 138 |

*Comparative Example

These examples demonstrate only using a Novolac epoxy (ECN) resin in the required amount yields a composition capable of achieving a combination of a tensile strength greater than or equal to 75 MPa, impact strength of greater than or equal to 40 J/m, Heat deflection temperature greater than or equal to 85° C. and an elongation at break greater than or equal to 70%. This shows there is an optimum level of ECN epoxy resin for composition ranges of 25-75 wt % PPSU and 25-75 wt % PPS.

Examples 24-35

The purpose of Examples 24-35 was to demonstrate the effect of changing amounts of PEI having PPS as the constituent in the majority. Compositions were made in accordance with the two pass method described above. For compositions not containing the Novolac epoxy (ECN) resin, only the PPS was added to the initial mixture. The compositions were tested as described above and results are shown in Tables 4A and 4B.

These results show with increasing amounts of PEI from 2.5 to 15 wt % and with

TABLE 4A

| Polymer | 24* | 25 | 26* | 27 | 28* | 29 |
|---|---|---|---|---|---|---|
| PPSU | 22.5 | 22.25 | 20 | 19.5 | 18.5 | 18.25 |
| PEI | 2.5 | 2.5 | 5 | 5 | 7.5 | 7.5 |
| PPS | 75 | 74.25 | 75 | 74.5 | 74 | 73.25 |
| ECN | | 1 | | 1 | | 1 |
| Tensile strength (MPa) | 68 | 73 | 73 | 74 | 69 | 76 |
| Tensile modulus (GPa) | 2988 | 3218 | 3162 | 3243 | 3166 | 3184 |
| % Elongation | 4 | 48 | 4 | 85 | 4 | 79 |
| Flexural strength (MPa) | 113 | 116 | 114 | 114 | 106 | 111 |
| Flexural modulus (GPa) | 2959 | 2877 | 2990 | 2801 | 2890 | 2806 |
| MFR 337° C., 6.7 Kg, 5 min (g/10 min) | 120 | 21 | 119 | 19 | 126 | 21 |
| HDT (1.82 MPa) | 97 | 95 | 92 | 91 | 84 | 88 |
| Notched Izod impact (J/m) | 27 | 43 | 28 | 42 | 28 | 54 |

*Comparative Example

TABLE 4B

| Polymer | 30* | 31 | 32* | 33 | 34* | 35 |
|---|---|---|---|---|---|---|
| PPSU | 45 | 44.5 | 40 | 39.5 | 35 | 34.5 |
| PEI | 5 | 5 | 10 | 10 | 15 | 15 |
| PPS | 50 | 49.5 | 50 | 49.5 | 50 | 49.5 |
| ECN | | 1 | | 1 | | 1 |
| Tensile strength (MPa) | 58 | 76 | 65 | 76 | 76 | 77 |
| Tensile modulus (GPa) | 2661 | 3091 | 2861 | 3109 | 2991 | 3095 |
| % Elongation | 56 | 80 | 27 | 88 | 13 | 77 |
| Flexural strength (MPa) | 116 | 124 | 117 | 116 | 115 | 121 |
| Flexural modulus (GPa) | 2804 | 2899 | 2794 | 2720 | 2724 | 2790 |
| MFR 337° C., 6.7 Kg, 5 min (g/10 min) | 66 | 9 | 73 | 9 | 71 | 7 |
| HDT (1.82 MPa) | 119 | 120 | 115 | 118 | 118 | 119 |
| Notched Izod Impact (J/m) | 36 | 50 | 37 | 66 | 38 | 68 |

*Comparative Example 1 wt % Novolac epoxy (ECN) resin, the compositions still achieves the desired levels of tensile strength, impact strength, HDT and % elongation performance.

A comparison of Examples 24-35 shows compositions comprising of PPSU, PPS and PEI there is a marked increase in tensile strength, elongation at break and impact strength in the presence of a ECN epoxy resin. Comparative examples show this improvement is not seen in examples comprising a PPSU, PPS and PEI without the epoxy and also none of the compositions have a combination of a tensile strength greater than or equal to 70 MPa, impact strength of greater than or equal to 40 J/m, and an elongation at break greater than or equal to 45%.

The results are further unexpected because (as evidenced by the % Elongation at break and impact strength results) the combination of a PPS, PEI and PPSU (they are immiscible and incompatible) when used in conjunction with ECN epoxy resin having an average of 2 or more epoxy groups per molecule, produce a composition that exhibits a ductility higher than the ductility of the PPS individually in PPS rich compositions.

Examples 36-41

The purpose of Examples 36-41 was to demonstrate the effect of changing amounts PEI in PPSU rich compositions. Compositions were made in accordance with the two pass method described above. For compositions not containing the Novolac epoxy resin (ECN), only the PPS was added to the initial mixture. The compositions were tested as described above and results are shown in Table 5.

TABLE 5

| Polymer | 36* | 37 | 38* | 39 | 40* | 41 |
|---|---|---|---|---|---|---|
| PPSU | 67.5 | 67 | 60 | 59.5 | 52.5 | 52 |
| PEI | 7.5 | 7.5 | 15 | 15 | 22.5 | 22.5 |
| PPS | 25 | 24.5 | 25 | 24.5 | 25 | 24.5 |
| ECN | | 1 | | 1 | | 1 |
| Tensile strength (MPa) | 75 | 78 | 76 | 78 | 79 | 84 |
| Tensile modulus (GPa) | 2627 | 2856 | 2764 | 2940 | 2811 | 2932 |
| % Elongation | 75 | 80 | 80 | 89 | 68 | 90 |
| Flexural strength (MPa) | 2590 | 2677 | 2802 | 2740 | 2635 | 2693 |
| Flexural modulus (GPa) | 115 | 122 | 121 | 126 | 121 | 129 |

TABLE 5-continued

| Polymer | 36* | 37 | 38* | 39 | 40* | 41 |
|---|---|---|---|---|---|---|
| MFR 337° C., 6.7 Kg, 5 min (g/10 min) | 17 | 14 | 18 | 12 | 21 | 11 |
| HDT (1.82 MPa) | 162 | 160 | 165 | 165 | 169 | 170 |
| Notched Izod Impact (J/m) | 134 | 154 | 80 | 115 | 82 | 96 |

*Comparative Example

These results show that with increasing amounts of PEI the compositions still achieve the desired levels of tensile strength, impact strength, and elongation.

Examples 42-53

The purpose of Examples 42-53 was to demonstrate the effect of differing amounts of Novolac epoxy (ECN) resin as well as the effect of alternate polymeric compounds having pendant epoxy groups in compositions having PPS, PEI and PPSU resins. Compositions were made by two step method with the composition preparation procedure described above. The compositions were tested as described above and results are shown in Table 6.

TABLE 6A

| Polymer | 42* | 43* | 44 | 45* | 46* | 47* |
|---|---|---|---|---|---|---|
| PPSU | 52.5 | 52.25 | 52 | 52.25 | 35 | 34.75 |
| PEI | 22.5 | 22.5 | 22.5 | 22.5 | 15 | 15 |
| PPS | 25 | 24.75 | 24.5 | 23.75 | 50 | 49.75 |
| ECN | | 0.5 | 1 | 1.5 | | 0.5 |
| Tensile strength (MPa) | 79 | 77 | 84 | 79 | 76 | 73 |
| Tensile modulus (GPa) | 2811 | 2724 | 2932 | 2734 | 2991 | 2904 |
| % Elongation | 68 | 81 | 90 | 64 | 13 | 96 |
| Flexural strength (MPa) | 2635 | 116 | 2693 | 119 | 115 | 113 |
| Flexural modulus (GPa) | 121 | 2543 | 129 | 2537 | 2724 | 2667 |
| MFR 337° C., 6.7 Kg, 5 min (g/10 min) | 21 | 16 | 11 | 14 | 71 | 12 |
| HDT (1.82 MPa) | 169 | 169 | 170 | 170 | 118 | 117 |
| Notched Izod Impact (J/m) | 82 | 90 | 96 | 99 | 38 | 54 |

*Comparative Example

TABLE 6B

| Polymer | 48 | 49* | 50* | 51* | 52 | 53* |
|---|---|---|---|---|---|---|
| PPSU | 34.5 | 34.25 | 18.5 | 18.25 | 18 | 17.75 |
| PEI | 15 | 15 | 7.5 | 7.5 | 7.5 | 7.5 |
| PPS | 49.5 | 49.25 | 74 | 73.75 | 73.5 | 73.25 |
| ECN | 1 | 1.5 | | 0.5 | 1 | 1.5 |
| Tensile strength (MPa) | 77 | 74 | 69 | 71 | 76 | 74 |
| Tensile modulus (GPa) | 3095 | 2946 | 3166 | 3039 | 3184 | 3090 |
| % Elongation | 77 | 84 | 4 | 4 | 79 | 31 |
| Flexural strength (MPa) | 121 | 117 | 106 | 106 | 111 | 108 |
| Flexural modulus (GPa) | 2790 | 2658 | 2890 | 2690 | 2806 | 2741 |
| MFR 337° C., 6.7 Kg, 5 min (g/10 min) | 7 | 9 | 126 | 36 | 21 | 25 |
| HDT (1.82 MPa) | 119 | 118 | 86 | 86 | 88 | 84 |
| Notched Izod Impact (J/m) | 68 | 63 | 28 | 50 | 54 | 55 |

*Comparative Example

These results show that with increasing amounts of PEI the compositions still achieve the desired levels of tensile strength, impact strength, and elongation.

Examples 54-59

The purpose of examples 54-59 was to demonstrate the effect of the process used to make the composition on the final physical properties of the composition. Compositions were made in a one pass method (in accordance to the composition preparation procedure described above) or a two pass method in which PPSU and PEI were melt mixed at 350 to 360° C. to form an initial mixture and then the initial mixture was melt mixed with the PPS and Novolac epoxy (ECN) resin at 330 to 340° C. or a modified two pass method in which PEI, PPS and Novolac epoxy resin were melt mixed at 340 to 350° C. to form an initial mixture and then melt mixed with PPSU resin at 340 to 350° C. The compositions were tested as described above and results are shown in Table 7.

TABLE 7

| Polymer | One pass 54* | One pass 55* | Two pass 56* | Two pass 57 | Modified Two Pass 58* | Modified Two Pass 59* |
|---|---|---|---|---|---|---|
| PPSU | 52.5 | 52 | 52.5 | 52 | 52.5 | 52 |
| PEI | 25 | 22.5 | 22.5 | 22.5 | 22.5 | 22.5 |
| PPS | 22.5 | 24.5 | 25 | 24.5 | 25 | 24.5 |
| ECN | | 1 | | 1 | | 1 |
| Tensile strength (MPa) | 75 | 75 | 79 | 84 | 45 | 76 |
| Tensile modulus (GPa) | 2752 | 2799 | 2811 | 2932 | 3302 | 3360 |
| % Elongation | 45 | 60 | 68 | 90 | 9 | 19 |
| Flexural strength (MPa) | 2582 | 2665 | 2635 | 2693 | 117 | 113 |
| Flexural modulus (GPa) | 118 | 120 | 121 | 129 | 3053 | 3231 |
| MFR 337° C., 6.7 Kg, 5 min (g/10 min) | 20 | 17 | 21 | 11 | 66 | 69 |

TABLE 7-continued

| Polymer | One pass 54* | One pass 55* | Two pass 56* | Two pass 57 | Modified Two Pass 58* | Modified Two Pass 59* |
|---|---|---|---|---|---|---|
| HDT (1.82 MPa) | 164 | 165 | 169 | 170 | 86 | 87 |
| Notched Izod Impact (J/m) | 75 | 82 | 82 | 96 | 33 | 33 |

*Comparative Example

Compositions made with the two pass method showed a greater increase in tensile strength, elongation at break, and impact strength than compositions made with the one pass method and modified two pass method.

Addition of epoxy shows good improvement in the tensile and impact strength compare to the control blends in some PPS rich and PPSU rich compositions. Two different types of multifunctional epoxies have been evaluated as a compatibilizer in PPSU/PPS system. The amount of epoxy in the composition varied from 0.5 to 1.5 wt % and 1% was found to optimum level to show enhancement in the properties like tensile and impact properties. Also the blends shows better flow performance compare to PPSU resin.

It has been found that, by addition of PEI as third component with or without epoxy to PPSU/PPS blends leads to an improvement in impact and tensile strength properties of the blend in comparison with neat PPSU and PPS blends. It is likely that PEI acts as a compatibilizing agent for PPSU/PPS blends especially in PPSU rich blends. It is expected that other polyetherimides such as Extem XH 1005, VH 1003, Ultem 6000, Siltem and Ultem 5001 resins would also be a good compatibilizer for the PPSU/PPS blends.

To make a secondary (PPSU/PPS) or ternary blend (PPSU/PEI/PPS) blends, one can blend all three components and extrude in one-pass. Alternatively, in a two-pass process, two of the components (e.g., PPSU and PEI) could be extruded first and then PPS and ECN added in the second pass. The two pass helps to get better compatibility than one pass and modified two pass, due to better reactivity of end groups with the compatibilizer.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A compatibilized blend of polyphenylene sulfone (PPSU) and polyphenylene sulfide (PPS) comprising:
   a) 20-77 wt % of a polyphenylene sulfone (PPSU);
   b) 20-77 wt % of a polyphenylene sulfide (PPS);
   c) 2.5-22.5 wt % a polyetherimide compatibilizer; and
   d) 0.5-1.5 wt % an epoxy compatibilizer;
   wherein the amounts of a), b), c), and d) are based on the overall weight of the compatibilized blend and together account for 100 wt % of the compatibilized blend.

2. The compatibilized blend of claim 1, wherein the compatibilized blend possesses a tensile strength greater than 75 MPa, an impact strength of at least 40 J/m, and an elongation at break of at least 70%.

3. The compatibilized blend of claim 1, wherein the epoxy compatibilizer is an epoxy cresol novolac resin.

4. The compatibilized blend of claim 1, wherein the polyphenylene sulfide (PPS) is a linear poly(phenylene) sulfide.

5. The compatibilized blend of claim 1, wherein the morphology of the compatibilized blend comprises fine, well-dispersed domains of polyphenylene sulfone (PPSU) and polyphenylene sulfide (PPS).

6. The compatibilized blend of claim 1, wherein the compatibilized blend exhibits a heat distortion temperature (HDT) of at least 87° C.

7. The compatibilized blend of claim 1 comprising:
   a) 24.5-74.5 wt % of the polyphenylene sulfone (PPSU);
   b) 24.5-74.5 wt % of the polyphenylene sulfide (PPS);
   c) 2.5-22.5 wt % of the polyetherimide compatibilizer; and
   d) 0.5-1.5 wt % of the epoxy compatibilizer;
   wherein the amounts of a), b), c), and d) are based on the overall weight of the compatibilized blend and together account for 100 wt % of the compatibilized bend.

8. An extrudate of the compatibilized blend of claim 1.

9. A molded product of the compatibilized blend of claim 1.

10. A method of preparing the compatibilized blend of claim 1, comprising:
    melt mixing the polyphenylene sulfone (PPSU), the polyphenylene sulfide (PPS), the polyetherimide compatibilizer, and the epoxy compatibilizer in a single pass through an extruder.

11. The method of claim 10, wherein the extruder is a twin screw, vented extruder.

12. The method of claim 11, wherein melt mixing is performed at a temperature of 300 to 350° C.

13. The method of claim 11, wherein melt mixing is performed at a screw speed of about 250 rotations per minute (rpm) and vented under vacuum.

14. A method of preparing the compatibilized blend of claim 1, comprising:
    (a) melt mixing the polyphenylene sulfone (PPSU) and the polyetherimide compatibilizer in a first pass through an extruder to form an initial mixture; and (b) melt mixing the initial mixture with the polyphenylene sulfide (PPS) and the epoxy compatibilizer in a second pass through the extruder.

15. The method of claim 14, wherein the extruder is a twin screw, vented extruder.

16. The method of claim 15, wherein melt mixing of step a) is performed at a temperature of 350 to 360° C., and melt mixing of step b) is performed at a temperature of 330 to 340° C.

17. The method of claim 15, wherein melt mixing of step a) and melt mixing of step b) are performed at a screw speed of about 250 rotations per minute (rpm) and vented under vacuum.

18. A method of preparing the compatibilized blend of claim 1, comprising:
 a) melt mixing the polyphenylene sulfide (PPS), the polyetherimide compatibilizer, and the epoxy compatibilizer in a first pass through an extruder to form an initial mixture; and
 b) melt mixing the initial mixture with the polyphenylene sulfone (PPSU) in a second pass through the extruder.

19. The method of claim 18, wherein the extruder is a vented, twin screw extruder.

20. The method of claim 19, wherein melt mixing of step a) and melt mixing of step b) are performed at a temperature of 340 to 350° C.

21. The method of claim 19, wherein melt mixing of step a) and melt mixing of step b) are performed at a screw speed of about 250 rotations per minute (rpm) and vented under vacuum.

* * * * *